US011776723B2

(12) United States Patent
Vyers et al.

(10) Patent No.: US 11,776,723 B2
(45) Date of Patent: Oct. 3, 2023

(54) DRIVE UNIT FOR GATE VALVE

(71) Applicant: INOVITA PTE LTD, Singapore (SG)

(72) Inventors: Emmanuel Vyers, Singapore (SG); Mie Kimura, Singapore (SG)

(73) Assignee: INOVITA PTE LTD, Singapore (SG)

( * ) Notice: Subject to any disclaimer, the term of this patent is extended or adjusted under 35 U.S.C. 154(b) by 0 days.

(21) Appl. No.: 17/819,056

(22) Filed: Aug. 11, 2022

(65) Prior Publication Data

US 2023/0051288 A1    Feb. 16, 2023

(30) Foreign Application Priority Data

Aug. 14, 2021  (JP) .................................. 2021-132098
Aug. 5, 2022   (JP) .................................. 2022-125735

(51) Int. Cl.
| H01F 7/06 | (2006.01) |
|---|---|
| H01F 7/08 | (2006.01) |
| F16K 31/06 | (2006.01) |
| H01F 7/02 | (2006.01) |

(52) U.S. Cl.
CPC .......... *H01F 7/064* (2013.01); *F16K 31/0668* (2013.01); *F16K 31/0679* (2013.01); *H01F 7/081* (2013.01); *H01F 7/02* (2013.01)

(58) Field of Classification Search
CPC ..... F16K 31/0668; F16K 31/0679; H01F 7/02
See application file for complete search history.

(56) References Cited

U.S. PATENT DOCUMENTS

| 4,870,306 | A | * | 9/1989 | Petersen | ................. | H02K 41/03 |
|---|---|---|---|---|---|---|
| | | | | | | 310/12.24 |
| 5,661,446 | A | * | 8/1997 | Anderson | ............ | H02K 41/031 |
| | | | | | | 335/229 |
| 7,121,820 | B2 | * | 10/2006 | Tooman | ................. | B29C 45/281 |
| | | | | | | 425/566 |
| 7,242,118 | B2 | * | 7/2007 | Sakamoto | .............. | H02K 33/16 |
| | | | | | | 310/15 |

(Continued)

FOREIGN PATENT DOCUMENTS

| JP | H11-125356 A | 5/1999 |
|---|---|---|
| JP | 2002-129921 A | 5/2002 |
| JP | 2005-337618 A | 12/2005 |

*Primary Examiner* — Eric Keasel
(74) *Attorney, Agent, or Firm* — Pearne & Gordon LLP

(57) ABSTRACT

A drive unit for a gate valve controls a flow rate of fluid passing through an opening in a valve seat by forward and backward moving a valve plate against the opening in the valve seat. This drive unit includes a shaft connected to the valve plate, a linear motor for driving the shaft and drive control means to control the drive of the linear motor. The linear motor has a plurality of coils for generating a magnetic field by electric current and a permanent magnet assembly to react to the magnetic field generated by the plurality of coils. The plurality of coils forms a stator while the permanent magnet assembly is connected to the shaft and displaced together with the shaft to form a mover to forward and backward move the valve plate. Each of the plurality of coils is connected to its own control circuit and the drive control means individually controls the current flowing through each of the plurality of coils via the control circuit. The drive control means may be provided with a linear encoder to detect the current position of the permanent magnet assembly.

18 Claims, 9 Drawing Sheets

(56) References Cited

U.S. PATENT DOCUMENTS 7,845,925 B2 * 12/2010 Tooman ................ B29C 45/281
  425/146
8,286,935 B2 * 10/2012 White ................... F16K 3/0254
  251/129.01

* cited by examiner

DRIVE UNIT FOR GATE VALVE

CROSS REFERENCE TO RELATED APPLICATIONS

This application claims priority to Japanese Patent Application No. 2021-132098 filed Aug. 14, 2021 and Japanese Patent Application No. 2022-125735 filed Aug. 5, 2022. The content of these applications is incorporated herein by reference in their entireties.

TECHNICAL FIELD OF THE INVENTION

The present invention relates to an improvement on a drive unit for a gate valve used in a processing chamber for a semiconductor device, for example to create a vacuum in the processing chamber and in particular to adjust a flow of a processing gas by properly controlling the upward and downward movement of a valve plate (forward and backward movement of the valve plate against the opening in the valve plate) and to reduce mechanical contact between parts to thereby reduce a particle generation and a time and effort required for maintenance and inspection.

BACKGROUND TECHNOLOGY

In the manufacturing process of semiconductor devices, in order to create a vacuum in a processing chamber for conducting a process such as thin-film process or PVD etc., by etching or CVD (chemical vapor deposition) etc. there has been used a gate valve between the processing chamber and a suction pump. For the gate valve is used a poppet valve in which a valve plate moves forward and backward (upward and downward) against an opening in a valve seat.

In general, a rotary motor is often used as a power source of the drive unit for upwardly or downwardly moving the valve plate of the poppet valve. However, in case where the rotary motor is used, there are required mechanical elements that require mechanical contact (metal contact) such as a belt, a ball screw and a bearing in order to transmit motive power to the poppet valve. This mechanical contact causes particles to be generated. If the particles are scattered in the processing chamber, they adversely affect the performance of the semiconductor device to be manufactured or possibly damage various measurement devices such as pressure sensors, which results in various defects. In addition thereto, the mechanical contact causes such problems as lifespan reduction due to wear and the requirement of grease for maintenance to avoid this, which causes time and effort to be required. Furthermore, due to the requirement of the large number of parts, there are required a lot of time and money for manufacturing and since there is limited the speed at which the valve plate upwardly and downwardly moves, it is not always possible to properly control its upward and downward movement.

In order to avoid these problems, it will be considered to use a linear motor that can upwardly and downwardly move the valve plate without requiring mechanical contact due to a thrust force generated between coils and magnets as the power source of the drive unit for the gate valve (see Patent Document 1, for example). For the drive unit for the gate valve having the linear motor used, in many cases, there is typically used a linear shaft motor where magnets are used as a stator and a coil is used as a mover, and then a magnetic field is generated by energizing the coil to thereby displace the coil, which is the mover, whereby the valve plate connected to the mover equipped with the coil upwardly and downwardly moves.

However, in case where there is used as the mover the coil necessary for being energized, there is required a cable (power line) for energizing the coil and since this power line is dragged along with the coil as the mover, which causes wire breakage trouble to thereby unable to ensure a long life and high maintainability. Furthermore, in accordance with the movement of the power line there is limited the control of the mover movement with high speed and high accuracy. In addition, it is necessary to secure a space for the movement of the power line, which limits the miniaturization.

For this reason, it has been proposed to use magnets as the mover and a coil as the stator in a linear motor (see Patent Document 2 and Patent Document 3, for example). However, in these linear motors, it is common to use three-phase coils (see FIG. 11 of Patent Document 3, for example). In the three-phase linear motor, in order to generate a magnetic field by energizing the coils, a current flows through all the coil parts by energizing them and such coil parts as do not exist in front of the magnets which are the mover and therefore do not need energizing originally continue to be also energized even though they are not required to be energized. (see FIG. 9).

If the current flows through such coil parts as do not need to be energized, Joule loss, iron loss in the core, and copper loss in the coil increase due to heat generation, which may possibly reduce conversion efficiency (cause output loss) and hinder the generation of greater thrust. In addition thereto, if the current flows through all coil parts, the current also flows through the coil parts located at the end of the mover equipped with the magnet, which results in the magnetic field loss due to the magnetic field wraparound from the end of the mover.

As the individual coils for three-phase coils become larger, the inductance also becomes larger, which in turn causes the time constant and dynamic response to decrease. Thus, in the conventional three-phase linear motor, it will be difficult to precisely control the speed of the magnets, which are the mover and to perform more precise positioning, which in turn makes it difficult to upwardly and downwardly move the valve plate at high speed and to control the gas flow more appropriately. Also, as a general problem with the linear motors, it is necessary to suppress cogging and ensure a smooth and accurate supply of thrust.

PRIOR ART DOCUMENTS

[Patent Document 1] JP 2005-337618A
[Patent Document 2] JPH11-125356A (JP1999-125356A)
[Patent Document 3] JP2002-129921

Problem to be Solved by the Invention

In view of the above problems, the problem to be solved by the present invention is to provide a drive unit for a gate valve which can generate a larger thrust force to increase the acceleration of the valve plate to thereby achieve upward and downward movement thereof at a high speed, and at the same time can more appropriately make a fine adjustment of the pressure by the gate valve by ensuring a smooth and accurate supply of the thrust force for this purpose and reduce the vibration thereof.

Means to Solve the Problem

As first means to solve the above problem, the present invention provides a drive unit for a gate valve for controlling a flow rate of fluid flowing through an opening of a valve seat by moving a valve plate forward and backward against the valve seat having the opening, the drive unit comprising a shaft connected to the valve plate, a linear motor for driving the shaft and drive control means to control the drive of the linear motor, the present invention is characterized in that the linear motor has a plurality of coils that generate a magnetic field by an electric current and permanent magnets that react to the magnetic field generated by the plurality of coils; wherein the plurality of coils are a stator while the permanent magnets are a mover which is connected to the shaft and moves with the shaft to thereby move the valve plate forward and backward and wherein the plurality of coils are each connected to their own control circuits and the drive control means individually controls the electric current flowing through each of the plurality of coils through their control circuits.

As second means to solve the above problem, the present invention provides a drive unit for a gate valve as set forth in the first means to solve the above problem, and wherein the drive control means flows the electric current through only the coil or coils among the plurality of coils necessary for displacing the magnets to the desired position.

As third means to solve the above problem, the present invention provides a drive unit for a gate valve as set forth in any of the first and second means to solve the above problem, and wherein the drive control means is provided with a linear encoder to detect the current position of the permanent magnets and controls the electric current through the plurality of coils by determining the coil or coils necessary for flowing the electric current therethrough to thereby display the permanent magnets to desired position in accordance with the magnet position detected by the linear encoder and the electric current to flow the coil or coils.

As fourth means to solve the above problem, the present invention provides a drive unit for a gate valve as set forth in any of the first through third means to solve the above problem, and wherein the drive control means controls the current flowing through the plurality of coils so that the phase of the electric current flowing through the plurality of coils is 90° ahead of the direction in which the magnets are to move with respect to the magnetic field of the magnets.

As fifth means to solve the above problem, the present invention provides a drive unit for a gate valve (where the coils are on the outside while the magnets are on the inside) as set forth in any of the first through fourth means to solve the above problem, and wherein the plurality of coils have a pair of coil units divided with a gap between them while the permanent magnets are formed by arranging a plurality of individual magnets on both sides of a plate portion of the slider and disposed within a gap between the pair of coil units.

As sixth means to solve the above problem, the present invention provides a drive unit for a gate valve as set forth in the fifth means to solve the above problem, and wherein the slider in which the plurality of individual magnets are mounted on the plate portion thereof have a plurality of guide shafts installed through the slider while the slider displaces along the plurality of guide shafts.

As seventh means to solve the above problem, the present invention provides a drive unit for a gate valve as set forth in the fifth or sixth means to solve the above problem, and wherein the linear motor comprises a set of motor units arranged so that the shaft is disposed between the set of motor units wherein the set of motor units are each provided with the plurality of coils and the permanent magnets and are driven synchronously.

As eighth means to solve the above problem, the present invention provides a drive unit for a gate valve as set forth in the seventh means to solve the above problem, and wherein the set of motor units shares a slider, which has a bearing for supporting the lower end of the shaft and two plate sections extending from the bearing and wherein the permanent magnets are mounted on each of the two plate sections so as to be allocated to the set of motor units.

As ninth means to solve the above problem, the present invention provides a drive unit for a gate valve as set forth in any of the fifth through eighth means to solve the above problem, and wherein the linear motor comprises seven or more individual permanent magnets and the plurality of 18 or more coils.

As tenth means to solve the above problem, the present invention provides a drive unit for a gate valve as set forth in any of the first through ninth means to solve the above problem, and wherein there is provided with a bellows having an opening for allowing the forward and backward movement of the shaft, disposed between the shaft and the permanent magnets and expanding and contracting following the displacement of the permanent magnets, and the bellows serves to block the inflow of an outside air into the drive unit from through the opening to thereby keep the inside of the drive unit airtight except for the passage of the shaft.

As eleventh means to solve the above problem, the present invention provides a drive unit for a gate valve as set forth in any of the first through tenth means to solve the above problem, and wherein the plurality of drive units support the valve plate and the plurality of drive units synchronously move forward and backward the valve plate against the valve seat having the opening.

As twelfth means to solve the above problem, the present invention provides a drive unit for a gate valve for controlling a flow rate of fluid flowing through an opening of a valve seat by moving a valve plate forward and backward against said valve seat having said opening provided therein, said drive unit comprising a shaft connected to said valve plate, a linear motor for driving said shaft and drive control means to control the drive of said linear motor, characterized in that said linear motor has a plurality of coils that generate a magnetic field by an electric current and permanent magnets that react to the magnetic field generated by said plurality of coils; wherein said plurality of coils are a stator while said permanent magnets are a mover which is connected to said shaft and moves together with said shaft to thereby move said valve plate forward and backward, wherein said plurality of coils are each connected to their own individual control circuits and said drive control means individually controls the electric current flowing through each of said plurality of coils through said drive control circuits and further comprises a linear encoder to detect the current position of said permanent magnets of said mover, wherein said linear encoder comprises a plurality of laser sources to irradiate lasers of different wavelengths toward said permanent magnets, which is the mover, and an image sensor to receive said lasers reflected from said permanent magnets of the mover, said plurality of laser sources are installed so as to face different orientation directions, and said image sensor detects the current position of said permanent magnets of the mover depending on the type of said lasers received by said image sensor and the position at which said lasers are received and wherein said drive control means controls the electric current through said plurality of coils by determining the coil or coils necessary for flowing the electric current therethrough to thereby display said permanent magnets to a desired position in accordance with the magnet position detected by said linear encoder and the electric current to flow through said coil or coils.

As thirteenth means to solve the above problem, the present invention provides a drive unit for a gate valve as set forth in claim 16, wherein the orientation direction of each of said plurality of laser sources is set in such a way that the range in which said image sensor can receive the laser irradiated by one of said plurality of laser sources and reflected by said permanent magnets and the range in which said image sensor can receive the laser irradiated by the other laser source and reflected by said permanent magnets are compartmentalized.

As fourteenth means to solve the above problem, the present invention provides a drive unit for a gate valve as set forth in claim 16 or 17, characterized in that said drive control means flows the electric current through only the coil or coils among said plurality of coils necessary for displacing said permanent magnets to the desired position Effects of the Invention In accordance with the present invention, as described above, since each of the plurality of coils serving as the stator is connected to its own independent control circuit and the drive control means individually controls the current flowing through each of the plurality of coils through its own individual control circuit, the plurality of coils can be individually controlled. Thus, the coils necessary for displacing the permanent magnets of the mover from the current position to the desired position can be selected from the plurality of coils and the appropriate magnitude electric current flows through the selected coil or coils. This allows the permanent magnets to be appropriately displaced and the forward and backward movement of the valve plate to the opening of the valve seat and the flow rate of the fluid through the valve plate can be precisely controlled. In addition thereto, due to the precise adjustment of the speed, an unexpected collision between the valve plate and the valve seat can be avoided.

In this case, in particular, in accordance with the present invention, as described above, the drive control means controls the electric current to flow through only the coil(s) necessary for displacing the permanent magnets to the desired position among the plurality of coils while no electric current flows through the coils unnecessary for displacing the permanent magnets of the mover from the current position to the desired position, in other words through the coils not faced to the permanent magnets of the mover or not positioned at the displaced position and therefore Joule loss, iron loss in the core, copper loss in the coils, magnetic saturation, and loss of magnetic field from the edge of the permanent magnets (slider) can be reduced. Accordingly, it is beneficial that the thrust can be efficiently ensured and the permanent magnets, that are the mover and thus the valve plate can be moved at high speed by an appropriate thrust force to thereby precisely control the pressure in the chamber. More specifically, in accordance with the present invention, since electric power can be saved by flowing the electric current through only the necessary coils, heat generation in the coils can be suppressed, and as a result, the coils as a whole can receive more electric power. Thus, the electric power can be converted into the thrust with higher efficiency to thereby displace the magnet with sufficient thrust.

In accordance with the present invention, as described above, the drive control means is provided with the linear encoder for detecting the current position of the permanent magnets, and the electric current through the plurality of coils is controlled by determining the coil(s) through which the electric current is required to flow and the electric current which should flow through the coil(s) in accordance with the current position of the permanent magnets detected by the linear encoder. Thus, the position of the permanent magnets, that are the mover and thus the position of the valve plate can be controlled more accurately and precisely.

In accordance with the present invention, as described above, the drive control means controls the electric current flowing through the plurality of coils so that the phase of the electric current flowing through the plurality of coils is (+ or −) 90° ahead of the magnetic field of the permanent magnets in the direction in which the permanent magnets should move. In general, the phase of the electric current flowing through the coils is delayed by 90° with respect to the voltage, but as the electric current is made 90° ahead of the direction in which the permanent magnets should move, the maximum thrust per ampere can be obtained, and the permanent magnets, that are the mover can be displaced at high speed with greater thrust force.

In accordance with the present invention, as described above, the plurality of coils are divided into a pair of coil units and arranged face to face with a gap between them, while the permanent magnets (permanent magnet assembly) are formed (or assembled) by arranging a plurality of single permanent magnets on both sides of the plate portion of the slider and placing them in a gap between the pair of coil units. This allows many single coils and single permanent magnets to be installed and the number of poles and slots to be adjusted appropriately to ensure sufficient thrust and smooth displacement of the mover. In addition, since the coils are located outside so as to face both sides of the permanent magnets located inside, and the coils are a stator that is fixed in place, the circuits for energizing the coils do not require the installation of cables for energizing, which can improve the durability and the maintainability.

In this case, in accordance with the present invention, as described above, the plurality of guide shafts are provided through the slider to the plate portion of which the plurality of single permanent magnets are attached and the slider is displaced along the plurality of guide shafts, so that the slider can be stably displaced without tilting, etc.

Furthermore, in accordance with the present invention, as described above, the linear motor has a set of motor units between which the shaft is disposed and the set of motor units is provided with a plurality of coils and permanent magnets, which are driven synchronously, so that the shaft can be displaced smoothly without tilting.

In accordance with the present invention, as described above, the set of motor units share the slider, which has a bearing for supporting the lower end of the shaft and two plate sections extending from the bearing with the permanent magnets attached to each of the two plate sections so as to be allocated to the set of motor units. Thus, the valve plate can be properly supported while reducing the number of parts and reducing the labor and costs for the manufacturing and maintenance.

In accordance with the present invention, as described above, since the linear motor has seven or more single permanent magnet units and a plurality of 18 or more coils, each individual single coil can be made smaller to thereby reduce inductance and improve the time constant and dynamic response. By this, the movement of the permanent magnets that are the mover can be speeded up and at the same time, the coils can be controlled individually. As a result, it is possible to finely set a large number of poles and slots such as 6 slots and 7 poles, for example. Thus, the movement of the mover can be closely and precisely controlled with greater torque and the torque pulsation is reduced, cogging is reduced, and smooth displacement (displacement with less noise and vibration) of the magnets of the mover is ensured, which is different from the case of three-phase motor having the limited slot and pole mechanism.

In accordance with the present invention, as described above, since the drive unit comprises a bellows having an opening to allow the shaft to move forward and backward and installed between the shaft and the permanent magnets to expand and contract in accordance with the displacement of the permanent magnets and the bellows serves to block the inflow of outside air into the drive unit through the opening to keep the inside of the drive unit airtight except for the passage of the shaft, a vacuum is maintained inside the drive unit without preventing the displacement of the permanent magnets (permanent magnet assembly). Thus, there is a practical benefit of suppressing external influences to be able to achieve the smooth displacement of the magnet assembly, which is the mover. In particular, in case where the bellows is made of a non-magnetic material such as stainless steel, it can expand and contract following the movement of the mover, regardless of the magnetic force of the magnets and can properly guide and buffer the mover.

In accordance with the present invention, in case where the valve plate is supported by a plurality of drive units as described above and the plurality of drive units synchronously move forward and backward the valve plate against the opening of the valve seat, the valve plate can be stably supported at least two points, and at the same time, since the plurality of drive units are driven synchronously, the valve plate can be moved smoothly and the flow rate of fluid can be controlled appropriately without any tilting of the valve plate.

According to the present invention, as described above, the linear encoder comprises a plurality of laser sources that irradiate lasers of different wavelengths (colors) toward the permanent magnets and an image sensor to receive the lasers reflected by the permanent magnets, the multiple laser sources are oriented in different directions, and the image sensor detects the current position of the permanent magnets according to the type of the lasers received by the image sensor and the position at which the laser is received. It should be noted that the laser beam from only one laser source in only one direction may not be sufficient to detect the position of the permanent magnets in the entire movable range due to the light receiving range of the image sensor, depending on the total length of the movable stroke of the mover. However, in the present invention, since the detection range is divided into an upper detection range and a lower detection range by two or more laser sources, for example, the position of the mover in its entire range of motion can be reliably detected, and in particular, if the permanent magnets, which are the mover, are positioned in the lower range, the position of the mover can be reliably detected. In particular, when the permanent magnets, which are the mover, is positioned downward and the valve plate is close to the valve seat opening, the contact between the valve plate and the valve seat must be accurately controlled, which can be accomplished by the present invention in which the position of the permanent magnets and thus the valve plate can be more accurately and precisely controlled by accurately detecting the position of the permanent magnets and thus the valve plate in the lower detection area.

EMBODIMENT OF THE INVENTION (1. Gate Valve)

Figure 1:
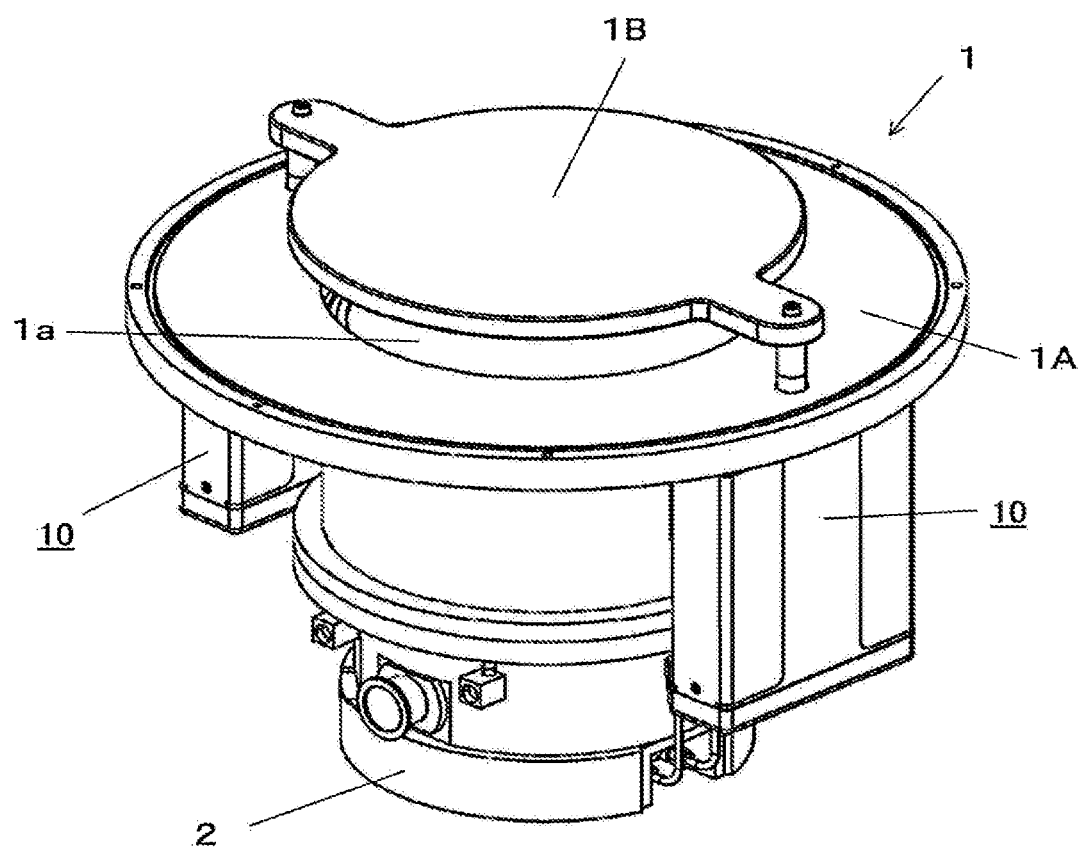
FIG. 1 is a perspective view of a gate valve equipped with a drive unit of the present invention.
Figure 2:
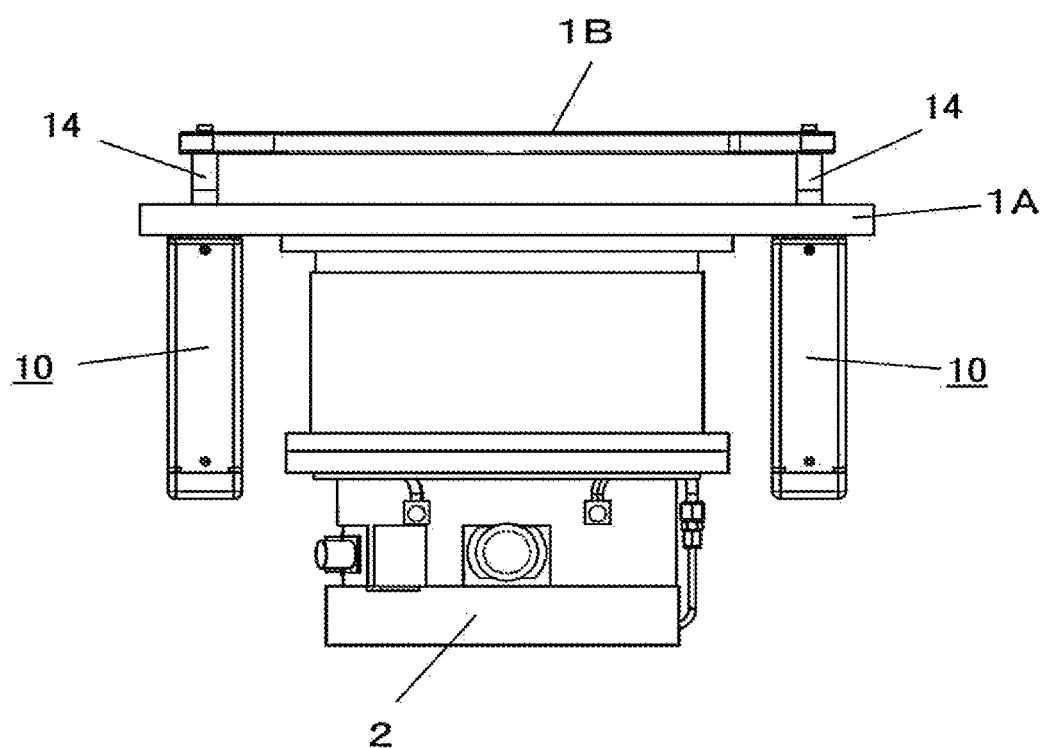
FIG. 2 is a front view of the gate valve equipped with the drive unit of the present invention.
Figure 3:
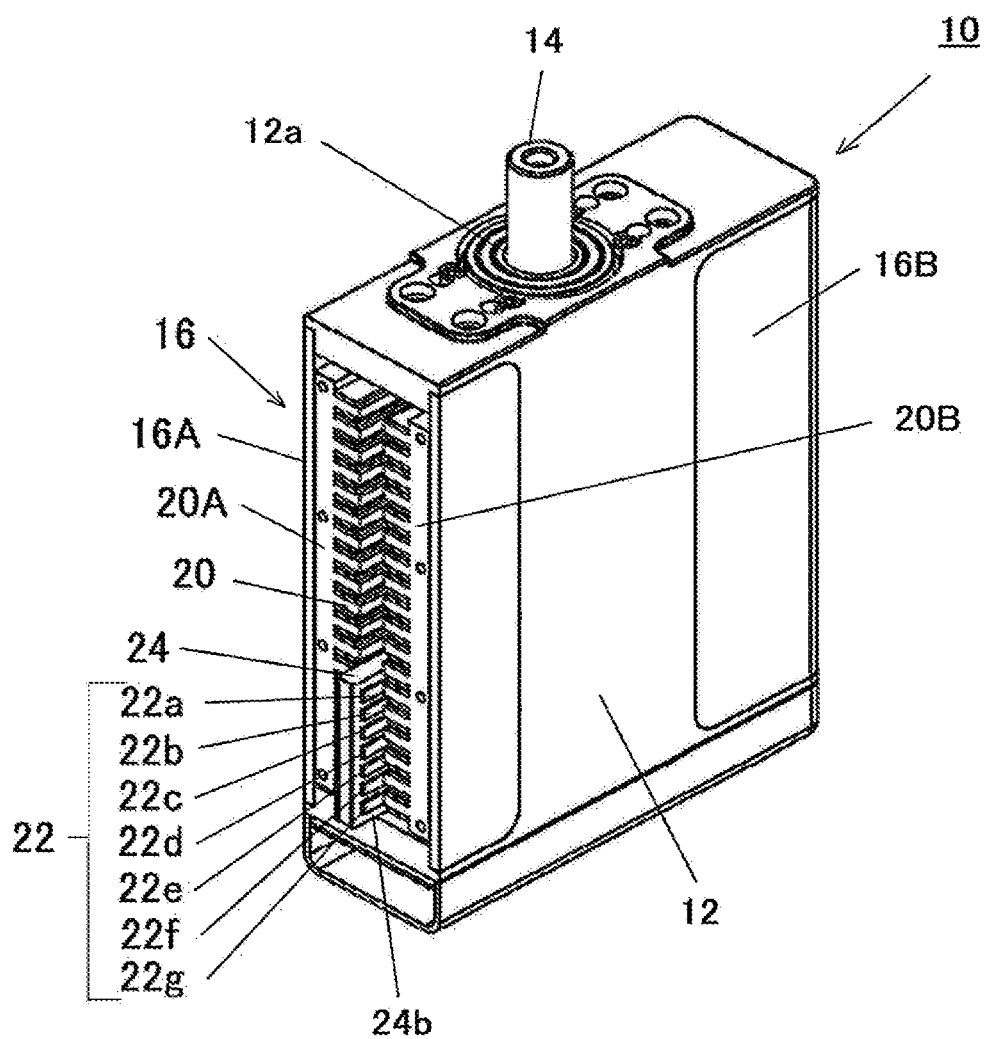
FIG. 3 is a partially exploded perspective view of the drive unit with a cover removed therefrom.

Explaining the mode in which the present invention is embodied in details with reference to the drawings, FIGS. 1 and 2 show a gate valve 1 equipped with a drive unit 10 of the present invention. As shown in FIGS. 1 and 2, the gate valve 1 is constructed above a suction pump 2 for adjusting the pressure in a processing chamber used for the manufacturing process of semiconductor devices (not shown) and is used for controlling the flow of fluid by the suction pump 2.

As shown in FIGS. 1 and 2, the gate valve 1 comprises a valve seat 1A having an opening 1a and a valve plate 1B that moves forward and backward against the opening 1a of the valve seat 1A. The drive unit 10 of the present invention moves this valve rate 1B forward and backward against the opening 1a of the valve seat 1A. The drive unit 10 controls the flow rate of the fluid passing through the opening 1a of the valve seat 1A by moving the valve plate 1B forward and backward against the opening 1a of the valve seat 1A. The valve seat 1A is formed of a non-magnetic material such as aluminum, for example.

(2. Drive Unit)

In the illustrated embodiment, as shown in FIGS. 1 and 2, the valve plate 1B is supported by a plurality of drive units, specifically, two drive units 10. More particularly, the two drive units 10 are connected to the flanges provided on both ends of the disc-shaped valve plate 1B and support the valve plate 1B at two points to move the valve plate 1B forward and backward against the opening 1a of the valve seat 1A. Therefore, the valve plate can be stably supported at two points. In this case, the plurality of (two) drive units 10 synchronously move the valve plate 1B forward and backward against the opening 1a of the valve seat 1A. Therefore, the valve plate 1B can be moved smoothly and the fluid flow rate can be controlled appropriately without any tilting of the valve plate 1B. Although, in the illustrated embodiment, the valve plate 1B is supported by two drive units 10, three or four drive units 10 other than two ones may be provided at equal intervals. In any case, the plurality of drive units 10 are desirably synchronized by a common control circuit to move the valve plate 1B forward and backward against the opening 1a of the valve seat 1A.

As shown in FIGS. 3 through 6, each of these plural drive units 10 comprises a casing 12, a shaft 14 which protrudes partly from the upper portion of the casing 12 and is connected to the valve plate 1B, a linear motor 16 which drives the shaft 14, and drive control means 18 (see FIG. 7) for controlling the drive of the linear motor 16. As shown in FIGS. 3 through 6, in the upper surface of the casing 12 is formed an opening 12a to allow the shaft 14 to move forward and backward.

(3. Linear Motor)

Figure 5:
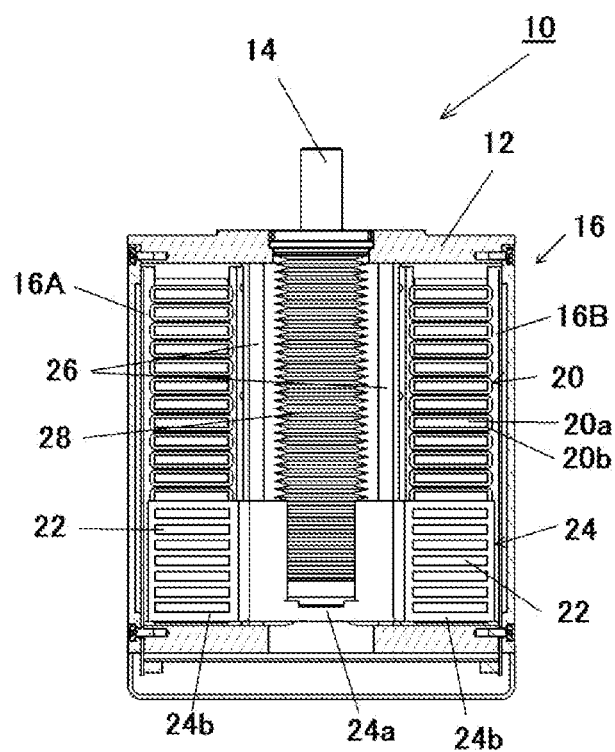
FIG. 5 is a cross-sectional view of the drive unit of the present invention having the state in which the permanent magnet assembly, which is the mover, is positioned at its lowest position.
Figure 6:
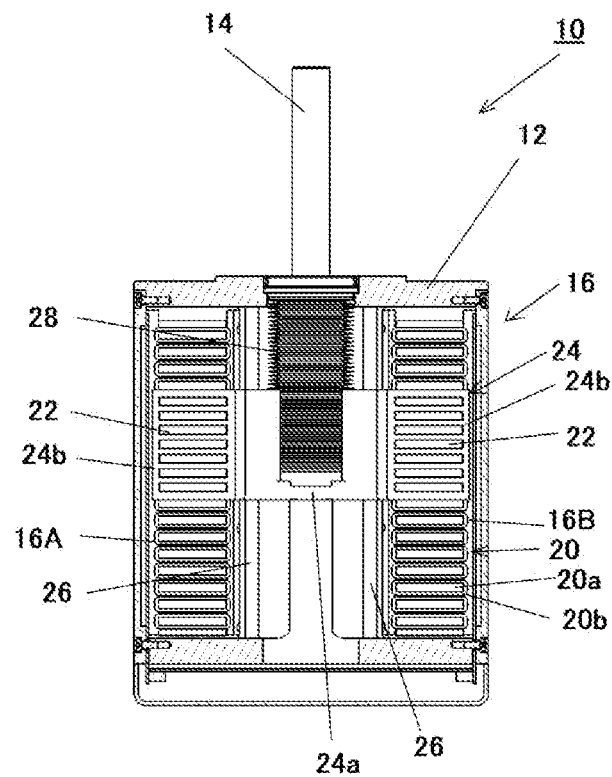
FIG. 6 is a cross-sectional view of the drive unit of the present invention having the state in which the permanent magnet assembly, which is the mover, is positioned at its uppermost position.

As shown in FIGS. 5 and 6, the linear motor 16 comprises a set of (two) motor units 16A and 16B arranged across the shaft 14. These motor units 16A and 16B each comprise a plurality of coils 20 and permanent magnets (permanent magnet assembly) 22. The set of motor units 16A and 16B are driven synchronously. Therefore, the set of motor units 16A and 16B can displace the shaft 14 smoothly without tilting it.

As shown in FIGS. 3 through 8, each of the motor units 16A and 16B has a plurality of coils 20 that generate a magnetic field by an electric current and permanent magnet (permanent magnet assembly) 22 that respond to the magnetic field generated by the plurality of coils 20. In this case, in the present invention, as shown in FIGS. 3 through 8, the plurality of coils 20 are a stator while the permanent magnets (permanent magnet assembly) 22 are a mover connected to the shaft 14 and moves with the shaft 14 to thereby move forward and backward the valve plate 1B.

More particularly, in each of the motor units 16A and 16B, as shown in FIGS. 3 through 8, the plurality of coils 20 are divided into one set of (two) coil units 20A and 20B, which are fixedly arranged in opposition to each other with a gap between them while the permanent magnets (permanent magnet assembly) 22 comprise a plurality of single magnets 22a through 22g, which are arranged side by side on both sides of a plate portion 24b of a slider 24 and are installed so that they are positioned in the gap between the coil units 20a and 20b.

Thus, in the present invention, it is possible to provide a large number of single coils 20 and single magnets 22, as shown in FIGS. 3 through 8. Therefore, the number of poles and slots can be adjusted appropriately to ensure sufficient thrust and smooth displacement of the mover, as described later. In addition, since the coils 20 are in the state where they are located outside the permanent magnets (permanent magnet assembly) 22 so as to face both sides of the permanent magnets 22 located inside, and since the coils 20 are a stator placed in a fixed position, the installation of any cables for energizing the coils 20 is unnecessary in the arrangement of the circuit for energizing the coil 20, which improves durability and maintainability.

In this case, as particularly shown in FIGS. 5 and 6, one set of motor units 16A and 16B share a slider 24, which has a bearing 24a provided in the center of the slider 24 to support the lower end of the shaft 14 and two plate portions 24b extending from the bearing 24a. The plurality of single magnets 22a through 22g are attached to each of the two plate portions 24b to form the set of motor units 16a and 16b divided.

Thus, when the slider 24 to which the permanent magnet assembly 22 is attached, is displaced in response to the magnetic field generated by energizing the coil units 16A and 16B, the shaft 14 whose lower end is supported by the bearing 24A, is also displaced. This allows the valve plate 1B connected to the shaft 14 to move forward and backward (lift and lower) against the opening 1a of the valve seat 1A. In this way, since one set of motor units 16A and 16B share the slider 24 and the bearing 24A of the slider 24 supports the lower end of the shaft 14, the number of parts can be reduced while properly supporting the valve plate 1B, to thereby reduce the time and cost of manufacturing and maintenance.

Figure 4:
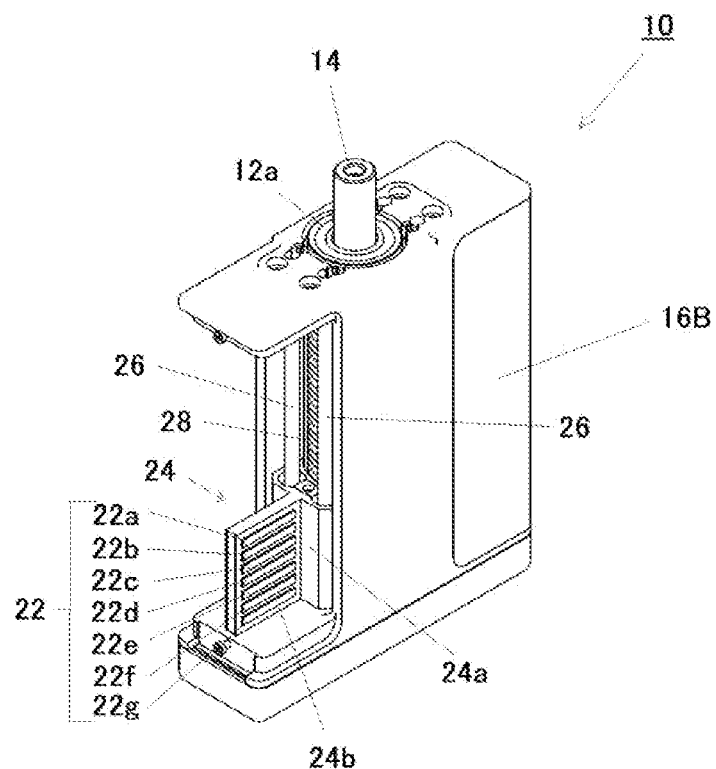
FIG. 4 is a partially exploded perspective view of the drive unit with the cover and the coil unit removed therefrom.

In addition, the slider 24 has a plurality of guide shafts 26 for each motor unit 16A, 16B, as shown in FIGS. 4 and 6 and in the illustrated embodiment, two guide shafts 26 as shown in FIG. 4. which are installed through the slider 24. and therefore, the slider 24 can be displaced along these two guide shafts 26 for each of the motor units 16A and 16B. Thus, if the set of motor units 16A and 16B are energized, the slider 24 is properly guided by the guide shafts 26 at four locations, the slider 24 can be stably displaced without positional displacement in the lateral direction and without any tilting thereof by the plurality of guide shafts 26 so that the permanent magnet assembly, which is the mover can be properly displaced.

In addition, the drive unit 10 of the present invention, especially as shown in FIGS. 5 and 6, has a bellows 28 that is provided between the shaft 14 and the permanent magnets 22 to expand and contract in accordance with the displacement of the permanent magnets 22. The bellows 28 blocks the inflow of outside air into the drive unit 10 from the opening 12a of the casing 12 to keep the inside of the drive unit 10 airtight except for the passage of the shaft 14. Therefore, the bellows 28 keeps the inside of the drive unit 10 in vacuum without interfering with the displacement of the magnet 22, and prevents the influence from the exterior. Thus, the smooth displacement of the permanent magnets 22, which are the mover can be achieved.

As shown in FIGS. 5 and 6, the bellows 28 is formed in a cylindrical shape with a bellows-like outer surface and with the shaft 14 extending within the bellows 28. The lower end of the bellows 28 is attached to the bearing 24a of the slider 24 while the upper end of the bellows 28 is attached to the peripheral portion of the opening 12a of the casing 12 so that the bellows 28 can be extended and retracted in accordance with the displacement of the slider 24 having the permanent magnet assembly 22, which is the mover. The bellows 28 may be desirably formed of non-magnetic material such as stainless steel (SUS304 or SUS316). In this way, by forming the bellows 28 from a non-magnetic material, the bellows 28 can be expanded and contracted following the movement of the slider 24 having the magnet assembly 22 as the mover, regardless of the magnetic force of the magnet assembly 22 and therefore, the slider 24 with the magnet assembly 22, which is the mover, can be properly guided and buffered.

(4. Control of the Linear Motor)

Figure 7:
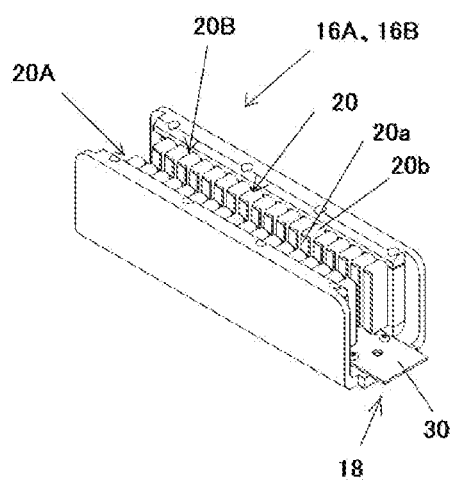
FIG. 7 is a perspective view of the coil unit used for the drive unit of the present invention.

In the linear motor 16 having the aforementioned mechanical configuration, in the present invention, the plurality of coils 20 are each connected to their own dedicated control circuits (switching circuits). More particularly, as shown in FIG. 7, each of the coil unit 16A and 16B is provided with a printed circuit board 30 that is a multi-phase circuit having the multiple control circuits (switching circuits) installed and each of the multiple coils 20 is individually connected to each of their own control circuits (switching circuits) set on the printed circuit board 30. The electric current flowing through each of the plurality of coils 20 can be controlled individually through each of the control circuits set up on the printed circuit board 30 by a software of a control device not shown for the drive control means 18. The plurality of coils 22 are energized through the printed circuit board 30, which results in eliminating the need for cables to energize the coils 22 and allowing for a compact design.

Figure 8:
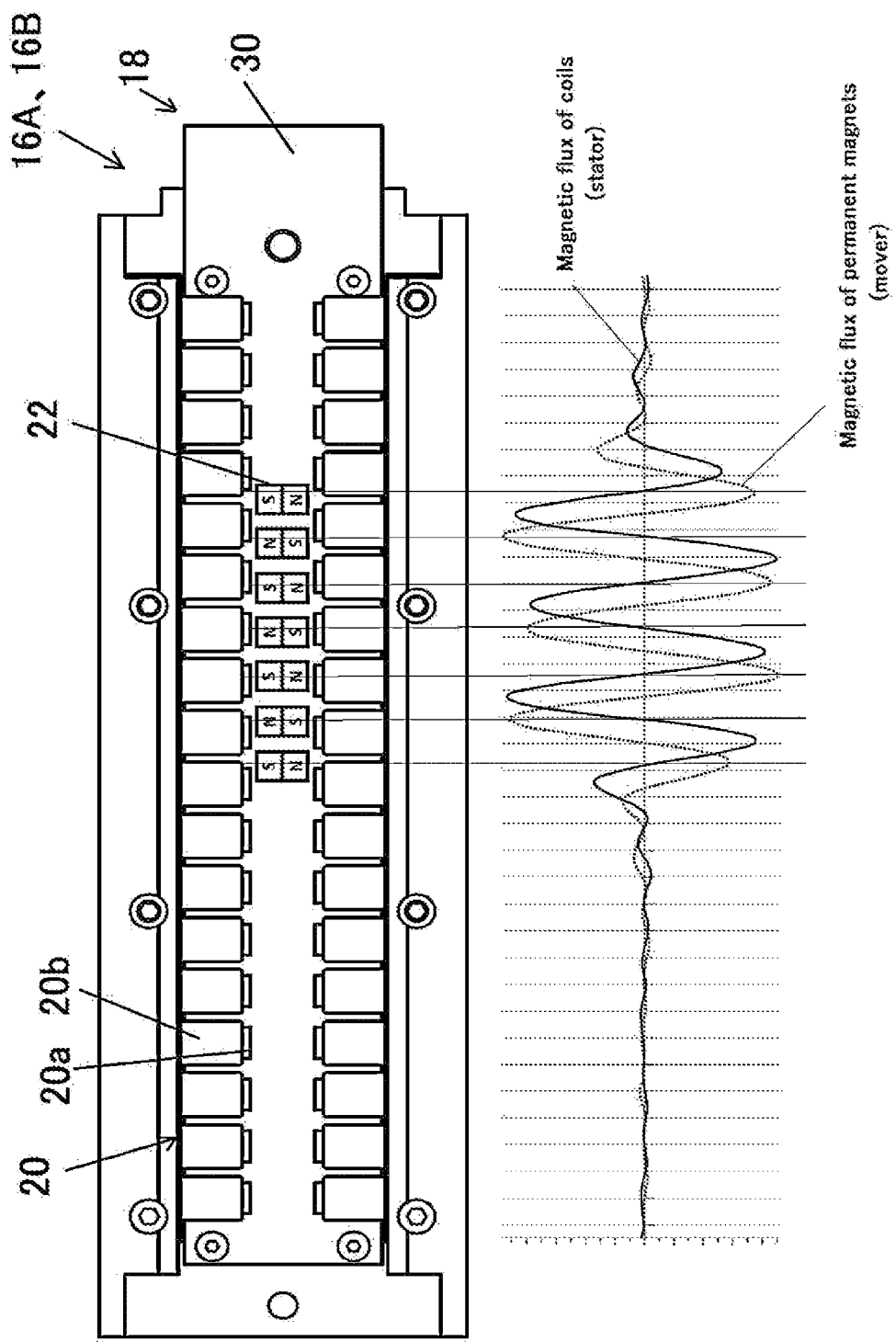
FIG. 8 shows the positional relationship between the coils and the permanent magnet assembly and the phase of the magnetic flux on the electric current flowing through the coils in the present invention.

In this manner, in the present invention, since the electric current flowing through each of the plurality of coils 20 is controlled individually, the plurality of coils 20 can be controlled for each coil 20. As shown in FIG. 8, there can be selected among the multiple coils the coil(s) 20 necessary for displacing the slider 24 equipped with the magnet assembly 22, which is the mover, from the current position to the desired position and the appropriate amount of electric current can flow through the selected necessary coil(s) 20. This allows the slider 24 with the magnet assembly 22, which is the mover, to be properly displaced to thereby precisely control the forward and backward movement of the valve plate 1B against the opening 1a of the valve seat 1A and therefore, the flow rate of fluid through the valve plate 1B to be precisely controlled. In addition, by adjusting the speed of the forward and backward movement of the valve plate 1B, there can be avoided an unexpected collision between the valve plate 1B and the valve seat 1A. In each of the motor units 16A and 16B, the single coils 20 placed across the magnet assembly 22, the electric current through each of the single (individual) coils 20 facing each other across the magnet assembly 22 is controlled in synchronization with the other coil(s) 20 facing each other. As shown in FIGS. 7 and 8, each of the single coils 20 comprises a core (iron core) 20a and a copper plate 20b arranged around the core (iron core) 20a.

Figure 9:
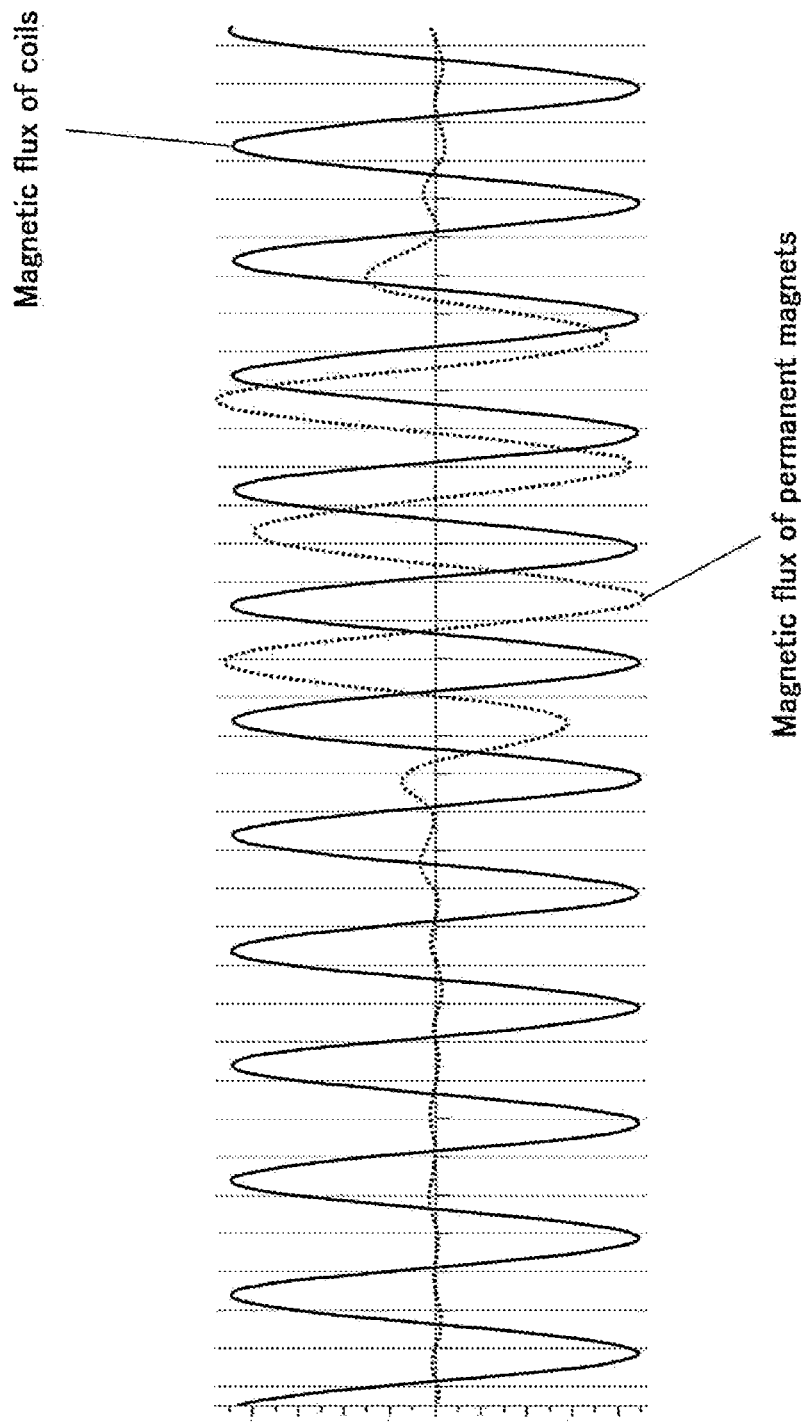
FIG. 9 is a graph showing the phase relation between the magnetic flux on the three phases electric current flowing through the coils and the magnetic flux of the permanent magnets in a conventional drive unit.

More particularly, in the present invention, as shown in FIG. 8, the drive control means 16 serves to flow the electric current through only the coil(s) 20 necessary for displacing the slider 24 equipped with the magnet assembly 22, which is the mover to the desired position, among the plurality of coils 20. In other words, as can be noted by comparing the phase of the electric current shown in FIG. 8 for the present invention with the phase of the electric current shown in FIG. 9 for the conventional three-phase linear motor, it is meant that the present invention does not unnecessarily flow the electric current through the coils 20 not necessary for displacing the slider 24 equipped with the magnet 22.

Therefore, in the present invention, as shown in FIG. 8, there flows no unnecessary electric current through the coils 20 not faced to the magnet assembly 22 which is the mover, or also not located at the displacement destination. This reduces Joule loss generated due to the electric current, iron loss in the core 20a, copper loss in the copper plate 20b, magnetic saturation, and loss of magnetic field from the end of the magnet assembly 22 (the slider 24), which is the mover to thereby effectively ensure the sufficient thrust. This allows the magnet assembly 22, which is the mover, and thus the valve plate 1B to move at high speed with appropriate thrust to precisely control the pressure in the processing chamber.

This also allows electric power to be saved by flowing the electric current through only the necessary coils 20, thus suppressing the heat generated by the coils 20. As a result, the coils 20 as a whole (each of the coil units 16A and 16B) can receive more electric power and therefore, the electric current can be converted into the thrust with higher efficiency to displace the slider 24 equipped with the magnet assembly 22, which is the mover, with sufficient thrust.

In this case, in the present invention, the linear motors 16 have seven single permanent magnets 22a through 22g and eighteen single coils 20 for each of the motor units 16SA and 16B, as shown in FIGS. 3, 4, 7 and 8. In other words, in the present invention, the number of coils 20 is greater than that of the permanent magnets 22, as can be noted particularly from FIG. 8, and the drive control means 18 generates the magnetic field by flowing the electric current through only the coils 20 required to displace the slider 24 equipped with the permanent magnets 22, which serves as the mover, to displace the slider 24 equipped with the permanent magnets 22 as the mover. As shown in FIGS. 3 through 8, the width of the single magnets 22 and the width of the coils 20 (of the core 20a) are set at almost the same, which causes the number of poles and slots to be able to be set appropriately. In addition, the plurality of permanent magnets 22 can be so configured that the directions of the S and N poles thereof are alternately different from each other whereby the magnetic field generated by the coils 20 can provide the thrust to the slider 24.

More particularly, as shown in FIG. 5, for example, in case where the slider 24 equipped with the permanent magnets (permanent magnet assembly) 22, which are the mover, is moved upward in FIG. 5 from its lowest position (where the valve plate 1B is in contact with the valve seat 1A having the opening 1a), there flows the electric current through only the six coils 20 located at the second through seventh portions from the bottom, for example, where exist at the position to be moved among the plurality of whole coils 20. Thus, the slider 24 moves to the desired position. By repeating this process, as shown in FIG. 6, the slider 24 equipped with the permanent magnets 22 as the mover can be displaced to the uppermost position (where the valve plate 1B is farthest away from the opening 1a of the valve seat 1A) as shown in FIG. 6.

Conversely, for example, as shown in FIG. 6, in case where the slider 24 with the permanent magnets 22, which is the mover should be moved to the lowest position in FIG. 6 from the uppermost position (where the the valve plate 1B is farthest away from the opening 1a of the valve seat 1A), there flows the electric current through only the six coils 20 that are in the position to be moved, such as the fifth to tenth coils 20 from the top and therefore, the slider 24 is moved downward in FIG. 6. By repeating this process, as shown in FIG. 5, the slider 24 equipped with the magnet assembly 22, which is the mover, can be displaced to the lowest position (where the valve plate 1B is in contact with the valve seat 1A so as to close the opening 1a).

Of course, not only the movement of the slider 24 between the lowermost and uppermost positions, but also the movement of the slider 24 to the position on the way where the required flow of fluid by the valve plate 1B is adjusted as required may be achieved. This may be conducted by appropriately selecting the coils 20 through which the electric current should flow by the drive control means 18, which is repeated back and forth. The speed of the slider 2.4 can also be finely adjusted by controlling the magnitude of the electric current flowing through each coil 20.

More specifically describing the control method, as shown in FIG. 8, the drive control means 18 may preferably control the electric current flowing through the plurality of coils 20 so that the magnetic flux on the electric current flowing through the plurality of coils 20 is 90° ahead of the magnetic flux of the permanent magnets 22 in the direction in which the permanent magnets 22 are to move. (e.g., in the direction of + when the shaft 14 is to be raised and in the direction of − when it is to be lowered). This is because, in general, the phase of the electric current flowing through the coils 20 is delayed by 90° with respect to the phase of the voltage and therefore is advanced by ±90° in the direction in which the permanent magnets 22 are to move to thereby be able to obtain the maximum thrust per ampere. Thus, the slider 24 equipped with the permanent magnets 22 can be displaced at a higher speed.

In this case, each of the 18 individual coils 20 is connected to its own one individual control circuit (switching circuit) and therefore, in the illustrated embodiment, there are provided a total of 18 phase multiphase circuits in the printed circuit board 30. As shown in FIGS. 3 through 8, since a large number of phases are set up in the present invention, the inductance of each of the individual coils 20 is reduced by making it smaller to improve the time constant and the dynamic response to thereby speed up the movement of the slider 24 with the magnet assembly 22 as the mover. In addition, the induced electromotive force (VL) is expressed by VL=L(di/dt) (L: inductance, di: change in electric current, dt: time). Thus, by controlling the magnitude of the change in the electric current and its time, the inductance of the coils 20 can be raised and lowered more quickly to thereby compensate for irregularities in the thrust.

As a result of being able to control these multiple coils individually in this way, it is possible to finely set a large number of poles and slots, and unlike the case of a three-phase system with a limited slot pole configuration, the movement of the slider 24 equipped with the magnet assembly 22, which is the mover, can be precisely and accurately controlled, and at the same time, the torque pulsation is reduced, cogging is reduced, and smooth displacement (displacement with less noise and vibration) of the slider 24 equipped with the magnet assembly 22 can be ensured.

More particularly, in the illustrated embodiment, as shown in FIG. 8, there are set the seven poles by seven magnets 22 and the 6-slot 7-poles by six energized coils, which will cause the larger number of poles and slots to be able to be set in comparison with the general 3-phase motor with 2 poles and 3 slots. This can achieve the improvement of the torque and the reduction of the torque pulsation. In this way, so as to be able to set the larger number of poles and slots, the linear motor 16 may be preferably provided with the seven or more single magnets 22 and 18 or more coils 20.

Furthermore, in the present invention, the drive control means 18 may be provided with a linear encoder, which will be described later in details with reference to FIGS. 10 and 11 in order to detect the current position of the permanent magnets 22 (with which the slider 24 is equipped). In accordance with the current position of the permanent magnets 22 detected by the linear encoder, the coils 20 through which the electric current is required to flow in order to displace the permanent magnets 22 to the desired position and the electric current that flows through the selected coils 20 can be determined to thereby control the electric current flowing through the plurality of coils 20. This allows the position of the slider 24 with the magnet assembly 22, which is the mover, and thus the position of the valve plate 1B to be controlled more accurately and precisely.

Figure 10:
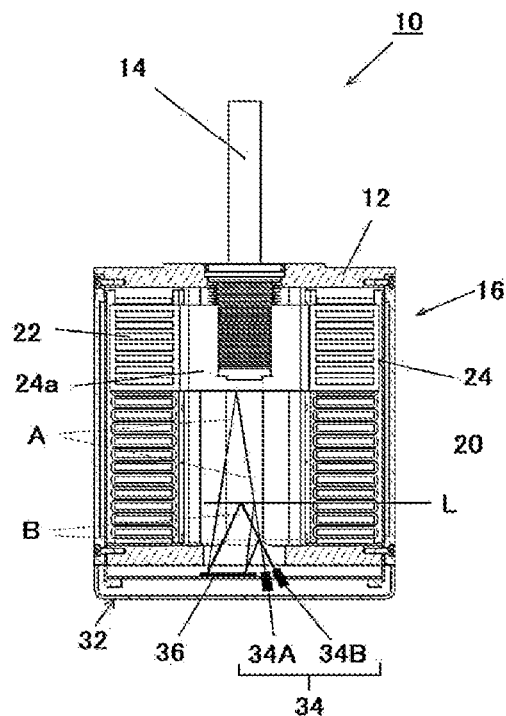
FIG. 10 is a front view of the drive unit equipped with a linear encoder.
Figure 11:
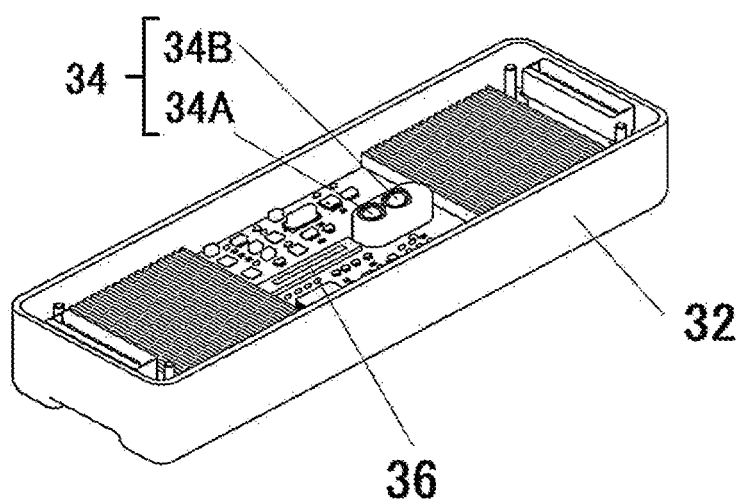
FIG. 11 is a schematically perspective view of the linear encoder used in the present invention.

The specifical embodiment of the linear encoder 32 used for the present invention is shown in FIGS. 10 and 11. The linear encoder 32 established below the casing 12 and comprises a plurality (two, for example) of laser sources 34 for irradiating lasers toward the slider 24 which is the mover equipped with the permanent magnets 22, specifically a first laser sources 34A and a second laser source 34B and an image sensor 36 such as CCD sensor, CMOS sensor and NMOS sensor to receive the lasers reflected by the slider 24 equipped with the permanent magnets 22. In this case, these multiple laser sources 34 irradiate the lasers of different wavelengths (the lasers of different colors). That is, for example, the multiple laser sources are so set that the first laser source 34A, one of the laser sources irradiates a red laser while the second laser 34B of the other laser source irradiates a green laser. This is to determine which of the laser sources 34A and 34B irradiates the laser, which is reflected by the image sensor 36.

As shown in FIGS. 10 and 11, these multiple laser sources 34A and 34B are disposed so as to be oriented in different directions. The reason for using the multiple laser sources and disposing them so as to be oriented in the different directions is to ensure the position of the slider 24, which is the mover equipped with the permanent magnets 22 in its full range of motion to be reliably detected and the position of the permanent magnet 22 of the mover and thus that of the valve plate 1B to be more accurately and precisely controlled.

More specifically, in the case of the linear encoder 32 using the lasers, the direction of the laser irradiation and the location (light-receiving range) of the image sensor 36 are limited to the range of the width of the bearing 24a of the slider 24, which is the mover equipped with the permanent magnets 22, as shown in FIG. 10. On the other hand, depending on the total length of the movable stroke of the mover, sometimes the laser irradiation in only one direction by one laser source may be insufficient to detect the position of the slider 24 of the mover in all of its movable range due to the light receiving range of the image sensor 36. In the case where only the first laser source 34A shown in FIG. 10, for example, is used for detecting the position of the slider 24, the position of the slider will not be able to be detected at the location where the slider 24 is positioned below the compartment line L (see FIG. 10) because the direction of the laser reflected off the slider 24 (the bearing 24a of the slider 24) will be out of the light-receiving range of the image sensor 36 as shown by the irradiation line A (see a thin line in FIG. 10). Conversely, with the second laser source 34B used as shown in FIG. 10, the position of the slider will not be also able to be detected at the location where the slider 24 is positioned above the compartment line L (see FIG. 10), because the direction of the laser reflected off the slider 24 (the bearing 24a of the slider 24) will be out of the light-receiving range of the image sensor 36 as shown by the irradiation line B (see a bold line in FIG. 10).

For the aforementioned reason, in the present invention, the multiple laser sources 34A and 34B are essentially provided toward the different orientation direction, and thereby the orientation direction of each of the laser sources 34 is so set that there are comparted the range within which the laser irradiated by the first laser source 34A and reflected back by the slider 24 equipped with the permanent magnets 22 to be able to be received by the image sensor 36 and the range within which the laser irradiated by the second laser source 34B and reflected by the slider 24 to be able to be received by the image sensor 36. More specifically, in the illustrated embodiment, the first laser source 34A centrally positioned detects the position of the slider 24, which is the mover, in the region above the compartment line L (see FIG. 10) while the second laser source 34B positioned outside of the first laser source 34A and directed in a further inwardly orientation direction (so that the shorter distance is the focal point) detects the position of the slider 24 in the region below the compartment line L (see FIG. 10).

In the case where the slider 24 with the permanent magnets 22, which are the mover is positioned downward as shown in FIG. 5, and the valve plate 1B is located close to the opening 1a of the valve seat 1A, the contact between the valve plate 1B and the valve seat 1A needs to be more precisely controlled. In the present invention, since the position of the slider 24 equipped with the permanent magnets 22, which are the mover, can be accurately detected even in the lower region of the valve plate 1B by the second laser source 34B, the position of the slider 24 can be more precisely controlled. Specifically, the laser irradiated from the second laser source 34B and reflected by the slider 24 is received by the image sensor 36 at a short distance and in a short time. As a result, the laser can be received with a higher resolution, and by analyzing the resolution in detail (subdivision), it is possible to more precisely detect the position of the slider 24 equipped with the permanent magnets of the mover.

The orientation direction of these two laser sources 34A and 34B should, of course, be continuously so set that there is no leakage in the detection range. The lower limit of the detection area, i.e., the compartment line L (FIG. 10) is determined in accordance with the range of being able to be received by the laser image sensor 36 at the location where the slider 24 equipped with the permanent magnets 22 of the mover is positioned at the uppermost. The first laser source 34A which covers the upper detection area, should have the installation angle and thus the orientation direction set according to the compartment line L. The second laser source 34B has the installation angle and thus the orientation direction set depending on the range within which the laser reflected by the slider 24 is capable to be received by the image sensor 36 in the case where the lower end of (the bearing 24a of) the slider 24 is located within the range below the compartment line L. Specifically, in the illustrated embodiment, the first laser source 34A is installed in the casing 12 at an angle of 82.3° while the second laser source 34B is installed in the casing 12 at an angle of 67°.

In this way, it will be noted that the type or kind of the laser received by the image sensor 34 and the position where the laser is received will differ depending on the type of the laser received by the image sensor 34 and the position of the slider, which is the mover equipped with the permanent magnets 22. Thus, the position of the slider 24 with the permanent magnets 22, which is the mover, can be accurately and precisely detected over the entire movement range of the mover according to the type of laser received by the image sensor 34 and the position at which the laser was received by the image sensor 34. Therefore, the position of the permanent magnets 22 and thus the position of the valve plate 1B can be more accurately and precisely controlled.

In the drive control means 18, the laser received by the image sensor 36 may be read on different dedicated channels for each laser wavelength and each laser (signal) may be assigned to a dedicated reading area for control, which allows more precise signal reception processing to be able to be achieved. It will be possible to program the system for more precise position control, especially in the lower detection region. In addition, there will be no need to completely demarcate the signal reception area by the image sensor 36 for each of the multiple laser sources 34 and the signal reception area may be partially overlapped near the compartment line L (see FIG. 10). In this case, the image sensor 36 will receive several different lasers at the same time, in which the slider 24 with the permanent magnets 22 of the mover will approach the lower detection area from the upper detection area whereby the operator determines that the position of the permanent magnets 22 of the mover and thus the valve plate 1B should be more carefully controlled in the lower detection area. The linear encoder 32 comprising the laser sources 34 and the image sensor 36 may be removably provided in the casing 12 so as to simplify the maintenance and the replacement thereof.

INDUSTRIAL APPLICABILITY

The present invention is widely applicable to processing chambers used for etching equipment for semiconductor devices, thin-film processing by CVD, PVD and even flat panel display manufacturing.

REFERENCE NUMERALS

1: gate valve
1A: valve seat
1a: valve seat opening
1B: valve plate
2: suction pump
10: drive unit
12: casing
12a: opening in the casing
14: shaft
16: linear motor
16A, 16B: a set of motor units
18: drive control means
20: coils
20A, 20B: a set of coil units
20a: core
20b: copper plate
22: permanent magnet assembly
22a through 22g: individual permanent magnets
24: slider
24a: bearing
24b: plate section
26: guide shaft
28: bellows
30: printed circuit board
32: linear encoder
34: laser sources
34A: first laser source
34B: second laser source
36: image sensor

The invention claimed is:

1. A drive unit for a gate valve for controlling a flow rate of fluid flowing through an opening of a valve seat by moving a valve plate forward and backward against said valve seat having said opening provided therein, said drive unit comprising a shaft connected to said valve plate, a linear motor for driving said shaft and drive control means to control the drive of said linear motor, characterized in that said linear motor has a plurality of coils that generate a magnetic field by an electric current and permanent magnets that react to the magnetic field generated by said plurality of coils; wherein said plurality of coils are a stator while said permanent magnets are a mover which is connected to said shaft and moves with said shaft to thereby move said valve plate forward and backward and wherein said plurality of coils are each connected to their own individual control circuits and said drive control means individually controls the electric current flowing through each of said plurality of coils through said drive control circuits.

2. A drive unit for a gate valve as set forth in claim 1, wherein said drive control means flows the electric current through only the coil or coils among said plurality of coils necessary for displacing said permanent magnets to the desired position.

3. A drive unit for a gate valve as set forth in claim 2, wherein said drive control means controls the electric current flowing through the plurality of coils so that the phase of the electric current flowing through said plurality of coils is 90° ahead of the direction in which said permanent magnets are to move with respect to the magnetic field of said permanent magnets and wherein said plurality of coils have a pair of coil units divided with a gap between them while said permanent magnets are formed by arranging a plurality of individual magnets on both sides of a plate portion of said slider and disposed within a gap between said pair of coil units.

4. A drive unit for a gate valve as set forth in claim 2, wherein said drive control means is provided with a linear encoder to detect a current position of said permanent magnets and said drive control means controls the electric current through said plurality of coils by determining the coil or coils necessary for flowing the electric current therethrough to thereby display said permanent magnets to a desired position in accordance with the magnet position detected by said linear encoder and the electric current to flow through said coil or coils.

5. A drive unit for a gate valve as set forth in claim 1, wherein said drive control means controls the electric current flowing through the plurality of coils so that the phase of the electric current flowing through said plurality of coils is 90° ahead of the direction in which said permanent magnets are to move with respect to the magnetic field of said permanent magnets.

6. A drive unit for a gate valve as set forth in claim 1, wherein said drive control means controls the electric current flowing through the plurality of coils so that the phase of the electric current flowing through said plurality of coils is 90° ahead of the direction in which said permanent magnets are to move with respect to the magnetic field of said permanent magnets, and wherein said plurality of coils have a pair of coil units divided with a gap between them while said permanent magnets are formed by arranging a plurality of individual magnets on both sides of a plate portion of said slider and disposed within a gap between said pair of coil units.

7. A drive unit for a gate valve as set forth in claim 6, wherein said linear motor comprises seven or more individual magnets and the plurality of 18 or more coils.

8. A drive unit for a gate valve as set forth in claim 6, wherein said slider in which said plurality of individual magnets are mounted on the plate portion have a plurality of guide shafts installed through said slider while said slider displaces along said plurality of guide shafts.

9. A drive unit for a gate valve as set forth in claim 8, wherein said linear motor comprises a set of motor units arranged so that said shaft is disposed between said set of motor units wherein said set of motor units are each provided with said plurality of coils and magnets and are driven synchronously.

10. A drive unit for a gate valve as set forth in claim 9, wherein said set of motor units shares said slider, which has a bearing for supporting the lower end of said shaft and two plate sections extending from said bearing, and wherein said magnets are mounted on each of said two plate sections so as to be allocated to said set of motor units.

11. A drive unit for a gate valve as set forth in claim 6, wherein said linear motor comprises a set of motor units arranged so that said shaft is disposed between said set of motor units wherein said set of motor units are each provided with said plurality of coils and magnets and are driven synchronously.

12. A drive unit for a gate valve as set forth in claim 11, wherein said set of motor units shares said slider, which has a bearing for supporting the lower end of said shaft and two plate sections extending from said bearing, and wherein said magnets are mounted on each of said two plate sections so as to be allocated to said set of motor units.

13. A drive unit for a gate valve as set forth in claim 1, wherein said drive control means is provided with a linear encoder to detect a current position of said permanent magnets and said drive control means controls the electric current through said plurality of coils by determining the coil or coils necessary for flowing the electric current therethrough to thereby display said permanent magnets to a desired position in accordance with the magnet position detected by said linear encoder and the electric current to flow through said coil or coils.

14. A drive unit for a gate valve as set forth in claim 1, wherein there is provided with a bellows having an opening for allowing the forward and backward movement of said shaft, disposed between said shaft and said magnets and expanding and contracting following the displacement of said magnets, and said bellows serves to block the inflow of an outside air into said drive unit through said opening to thereby keep the inside of said drive unit airtight except for the passage of said shaft.

15. A drive unit for a gate valve as set forth in claim 1, wherein said plurality of drive units support said valve plate and said plurality of drive units synchronously move forward and backward said valve plate against said valve seat having the opening.

16. A drive unit for a gate valve for controlling a flow rate of fluid flowing through an opening of a valve seat by moving a valve plate forward and backward against said valve seat having said opening provided therein, said drive unit comprising a shaft connected to said valve plate, a linear motor for driving said shaft and drive control means to control the drive of said linear motor, characterized in that said linear motor has a plurality of coils that generate a magnetic field by an electric current and permanent magnets that react to the magnetic field generated by said plurality of coils; wherein said plurality of coils are a stator while said permanent magnets are a mover which is connected to said shaft and moves together with said shaft to thereby move said valve plate forward and backward, wherein said plurality of coils are each connected to their own individual control circuits and said drive control means individually controls the electric current flowing through each of said plurality of coils through said drive control circuits and further comprises a linear encoder to detect the current position of said permanent magnets of said mover, wherein said linear encoder comprises a plurality of laser sources to irradiate lasers of different wavelengths toward said permanent magnets, which are the mover, and an image sensor to receive said lasers reflected from said permanent magnets of the mover, said plurality of laser sources are installed so as to face different orientation directions, and said image sensor detects the current position of said permanent magnets of the mover depending on the type of said lasers received by said image sensor and the position at which said lasers are received and wherein said drive control means controls the electric current through said plurality of coils by determining the coil or coils necessary for flowing the electric current therethrough to thereby display said permanent magnets to a desired position in accordance with the magnet position detected by said linear encoder and the electric current to flow through said coil or coils.

17. A drive unit for a gate valve as set forth in claim 16, wherein the orientation direction of each of said plurality of laser sources is set in such a way that the range in which said image sensor can receive the laser irradiated by one of said plurality of laser sources and reflected by said permanent magnets and the range in which said image sensor can receive the laser irradiated by the other laser source and reflected by said permanent magnets are compartmentalized.

18. A drive unit for a gate valve as set forth in claim 16, characterized in that said drive control means flows the electric current through only the coil or coils among said plurality of coils necessary for displacing said permanent magnets to the desired position.

* * * * *